Patented Feb. 15, 1938

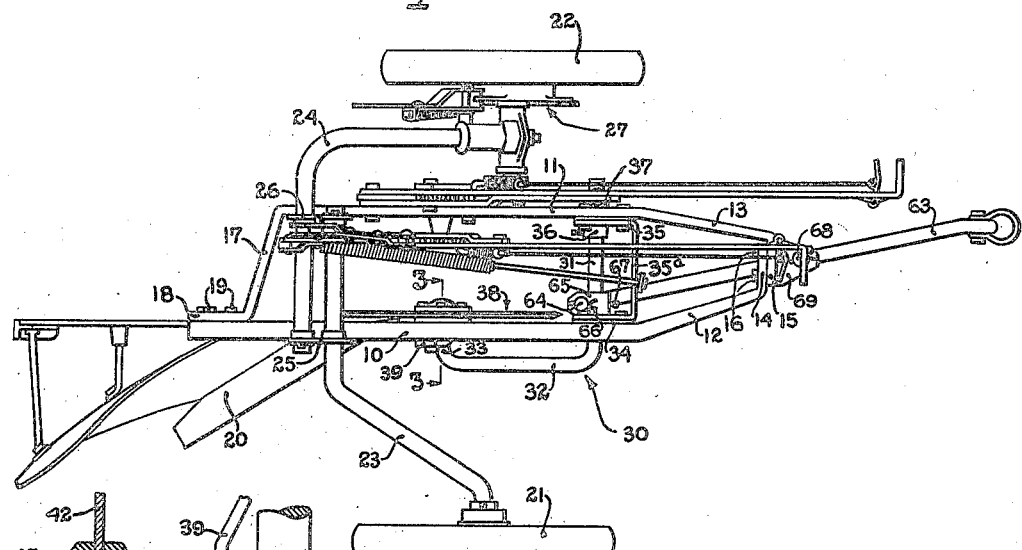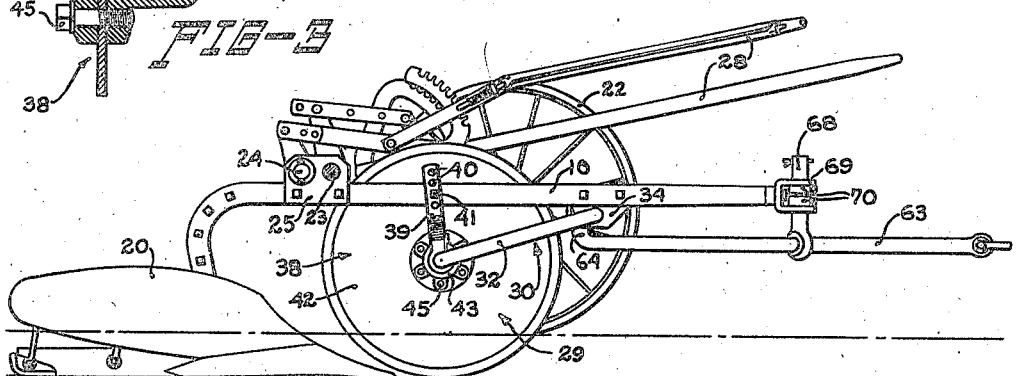

2,108,351

UNITED STATES PATENT OFFICE 2,108,351

PLOW

Walter H. Silver, Moline, Ill., assignor to Deere & Company, Moline, Ill., a corporation of Illinois Application November 2, 1936, Serial No. 108,758

8 Claims. (Cl. 97—209)

The present invention relates generally to plows and more particularly to an improved rolling colter mounting for plows of the type used in plowing bog land. The rolling colter is provided to cut through the surface trash, down through the ground to the point of the share. In this way a clean furrow wall is secured, and the plow bottom can easily turn the cut completely over.

Heretofore rolling colters were journaled between supporting bars, which were fixed to a vertical standard attached to the beam of the plow. This type of mounting was undesirable inasmuch as the surface trash on the landside entangled the bars and standard and clogged the colter. Another undesirable feature of this mounting was that the colter could not be adjusted laterally to any appreciable extent, as in the case of difficult scouring soil the colter must be set farther to the land to secure increased pressure on the moldboard.

It is the object of this invention to provide a rolling colter mounting which will shed the surface trash.

Another object is to provide for independent vertical and horizontal adjustment of the colter, so that if it is desired to adjust the rolling colter vertically, the horizontal adjustment need not be disturbed and vice versa.

Another object is to utilize the colter mounting for a simplified adjustable hitch connection, which will offer a minimum resistance to surface trash.

I accomplish these objects by the construction and arrangement of parts shown in the drawing and hereinafter particularly described.

In the drawing:

Figure 1 is a plan view of a plow embodying the principles of my invention;

Figure 2 is a side view of the plow in an operating position with the furrow wheel removed; and Figure 3 is a sectional view taken along the line 3—3 of Figure 1.

As best shown in Figure 1, what may be termed the frame of the plow comprises two parallel beams, the plow beam 10 and a laterally spaced beam 11. The front ends of the beams 10 and 11 are made to converge inwardly at 12 and 13 in order to offer less resistance when traveling through brush or trash. The ends 14 and 15 are bent at right angles to the parallel beams and are secured together by bolts 16. The rear of the beam 11 is bent inwardly at 17 toward the plow beam and is bent at 18 parallel to the beam 10 and secured thereto by bolts 19. The beam 10 has a plow bottom 20 fixed to the end thereof in the usual manner.

The frame of the plow is supported on a furrow wheel 21 and a land wheel 22. The furrow wheel 21 is mounted on a swinging crank axle 23, and the land wheel 22 is mounted on a swinging crank axle 24. The crank axles 23 and 24 are suitably journaled in plates 25 and 26 fixed on the beams 10 and 11.

The axle of the land wheel 22 is provided with a clutch mechanism 27, by which traction power of the land wheel 22 is employed to raise the plow. As such mechanism is well known, it will not be described in detail here. The plow is adjusted to any desired depth by means of levers 28 connected by linkage to the crank axles in any conventional manner.

The rolling colter unit indicated by the reference numeral 29 comprises a crank axle 30 having a transversely extending supporting portion 31 mounted on the plow frame, an arm portion 32 extending downwardly and rearwardly from the furrowward end of the supporting portion, and an axle portion 33 turned landwardly at the end of the arm portion 32. The laterally extending bearing portion 31 is journaled in plates 34 and 35 fixed to the beams 10 and 11, which are spaced at this point by a transverse brace 35a.

The crank member 30 is held against lateral movement by means of set collars 36 and 37, provided on the laterally extending portion 31, on each side of the plate 35, as shown in Figure 1.

The axle portion 33 of the crank 30 has a disk colter 38 journaled at the end thereof. The crank 30 is held against vertical swinging movement by means of a strap 39 having an opening at one end through which the axle portion 33 extends, the other end of the strap 39 being provided with a series of holes 40. A bolt 41 inserted through one of the holes 40 and an aligned hole provided in the beam 10 secures the strap 39 to the beam 10.

To adjust the colter laterally the set collars 36 and 37 are loosened on the laterally extending portion 31, after which the crank 30 can be moved laterally toward or away from the plow bottom, as desired. The vertical adjustment of the colter 38 is not affected by the lateral adjustment, for the axle portion 33 moves laterally in the opening in the lower end of the strap 39. When the rolling colter unit 29 is in its desired position the set collars 36 and 37 are tightened and the rolling colter unit 29 is rigidly held in its adjusted position.

To adjust the colter vertically the bolt 41 is removed and the crank 30 moved up or down, pivoting about the laterally extending portion 31. When the colter unit is in the desired position the bolt 41 is inserted through another of the holes 40 in the strap 39 and the hole in the beam 10, thereby securing the strap 39 and the beam 10 rigidly together.

The colter 39 comprises a circular disk 42, the periphery of which is sharpened to a cutting edge, a cup-like hub member 43 and a hub cap 44. The disk 42 is secured to the hub by bolts 45 which are inserted in aligned openings in the hub cap 44, the disk, and the hub member 43. The interior surface 46 of the hub member 43 is machined to provide an outer bearing surface for a roller bearing 47. A sleeve 48 provides the inner bearing surface for the roller bearing. The sleeve 48 slides over the end of the axle portion 33 of the crank 32 and engages a shoulder 49 thereon. The sleeve is held from axial movement by a washer 50 secured to the end of the axle by a nut 51, which is threaded on a stud 52 in the end of the axle.

The plow is pulled by means of a hitch which is adapted to offer a minimum resistance to brush and trash, while providing for vertical and horizontal adjustment. The hitch comprises a draw bar 63, the rear end of which is bent upwardly to form a spindle 64. The spindle is inserted through a vertically extending opening in an anchor block 65 wherein it is slidable, and held in place by a cotter pin 66. The anchor block 65 is also provided with a horizontally extending aperture through which the bearing portion 31 of the colter crank member 30 is inserted. The block 65 is slidable laterally on the bearing portion 31 and is fixed in adjusted position by a set screw 67.

The draw bar 63 extends forwardly through an opening provided in a vertical bar 68. The vertical bar 68 is inserted through vertically aligned openings in a U-shaped bracket 69 secured on the front of the plow beam ends 14 and 15, by means of the bolts 16. The vertical bar 68 is secured in place by set collars 70 provided between the sides of the U-shaped bracket 69. The end of the draw bar 63 is provided with the usual clevis by which the plow is connected to the tractor.

The draw bar 63 is adjusted laterally by loosening the screw 67 and moving the block 65 along the portion 31, the draw bar 63 swinging about the axis of the vertical bar 68, which rotates in its bracket. The hitch may be adjusted vertically by loosening the set screws of the collars 70 and the set screw 67 of the collar 65, allowing the draw bar 63 to be raised or lowered, the upright end 64 turning the collar 65 on the laterally extending portion 31 and the center of the draw bar 63 moving the bar 68 vertically in the openings of the bracket 69. When the hitch is in its desired position the set screw 67, and the set screws in the collars 70 are tightened and the hitch 63 is rigidly held in place.

The advantages of a plow embodying the principles of my invention for use in bog land or other places where there is a large quantity of brush or trash, are evident. The plow has a minimum of projecting corners and edges on which to collect trash. The single crank arm 32 located on the furrowward side of the colter away from the long, uncut trash and the absence of vertical standards in the colter mounting are particularly advantageous for shedding trash. The novel hitch, without the usual low transverse supporting members for the draw bar or side plates for adjusting the draw bar, is particularly adapted for cleaving through the brush. The converging plow beams 12, 13 are also conducive toward this end. It is to be noted, however, that the simplicity of my design is not obtained at the expense of adjustability, as the design provides for a full range of vertical and lateral adjustment of the hitch.

I do not intend my invention to be limited to the precise details shown and described herein except as set forth in the following claims.

I claim:

1. In combination with a plow having a pair of laterally spaced, longitudinally extending beams, a rolling colter, and supporting means therefor providing independent vertical and lateral adjustments of said colter, said supporting means comprising a journal bearing on each of said laterally spaced beams, and a crank axle swingably mounted in said bearings and slidable laterally therein, said colter being journaled at the end of said crank axle.

2. In combination with a plow having a pair of laterally spaced, longitudinally extending beams, a rolling colter, and supporting means therefor providing independent vertical and lateral adjustments of said colter, said supporting means comprising a journal bearing on each of said laterally spaced beams, a crank axle swingably mounted in said bearings and slidable laterally therein, said colter being journaled at the end of said crank axle, means for fixing said crank axle in various selected positions of lateral adjustment, and means for fixing said crank axle in various selected angular positions relative to said beams.

3. In combination with a plow, a colter and adjustable supporting means therefor comprising a crank axle having a transversely extending bearing portion and a crank arm portion, journal bearing means for rotatably supporting said bearing portion on said plow, means for attaching said colter to the end of said crank arm portion, and bracing means between said colter connected end of the crank arm and said plow for adjustably fixing the angular position of said crank arm relative to said plow.

4. A mounting for a rolling colter on an agricultural implement, said mounting comprising a crank axle having a bearing portion, a crank arm portion, and an axle portion, journal bearing means for supporting said bearing portion whereby said crank arm portion is swingable longitudinally of said plow, said axle portion extending landwardly from said crank arm portion and providing an axle support for said rolling colter, and bracing means between said axle portion and said implement for adjustably fixing the angular position of said crank axle relative to said implement.

5. A mounting for a rolling colter on an agricultural implement having a longitudinal beam, said mounting comprising a crank axle having a transversely extending bearing portion journaled on said beam and slidable laterally thereon, collars on said bearing portion for adjustably securing said bearing portion against lateral movement, a crank arm portion extending rearwardly from the furrowward end of said bearing portion of the crank axle, an axle portion extending landwardly from the end of said crank arm portion, bracing means connected to said axle portion and extending substantially vertically to said beam, and means for adjustably securing said bracing means to said beam for adjusting the height of said axle portion relative to said beam.

6. A combined hitch and colter mounting for an agricultural implement having a pair of laterally spaced longitudinally extending beams, which comprises a pair of transversely aligned journal bearings, one of said bearings being associated with each of said beams, respectively, a crank axle having a transversely extending bearing portion journaled in said bearings, a crank arm portion connected to one end of said bearing portion, and a colter-carrying portion at the end of said arm portion, means for adjustably fixing the position of said crank axle relative to said implement, an anchor block disposed on said bearing portion and adapted for lateral adjustment thereon, and a draw bar pivotally connected to said anchor block and extending forwardly therefrom.

7. A combined hitch and colter mounting for an agricultural implement having a pair of laterally spaced longitudinally extending beams, which comprises a pair of transversely aligned journal bearings, one of said bearings being associated with each of said beams, respectively, a crank axle having a transversely extending bearing portion journaled in said bearings, a crank arm portion connected to one end of said bearing portion, and a colter-carrying portion at the end of said arm portion, means for adjustably fixing the position of said crank axle relative to said implement, an anchor block slidably disposed on said bearing portion, means for fixing said block on said portion in adjusted position, a draw bar pivotally connected to said anchor block and extending forwardly therefrom, a supporting member for the draw bar disposed forwardly of said anchor block, said member being vertically adjustable relative to said beams, and means for fastening said member on said beams in adjusted position.

8. In a combined colter mounting and hitch for a plow, a colter-carrying crank axle having a transversely extending bearing portion journaled on the plow, a draw bar, means for connecting the rear end of said draw bar to said bearing portion, said connecting means providing for lateral adjustment of said draw bar on said bearing portion, and means for supporting said draw bar intermediate the ends thereof comprising a vertically disposed bar connected to said draw bar, a bracket fixed to said plow and having vertically aligned openings receiving said vertical bar, and a set collar embracing said vertical bar and engaging said bracket for adjustably fixing the position of said vertical bar vertically with respect to said bracket.

WALTER H. SILVER.